(12) United States Patent
Sturman (10) Patent No.: US 11,519,321 B2
(45) Date of Patent: Dec. 6, 2022

(54) FULLY FLEXIBLE, SELF-OPTIMIZING, DIGITAL HYDRAULIC ENGINES AND METHODS WITH PREHEAT

(71) Applicant: Sturman Digital Systems, LLC, Woodland Park, CO (US)

(72) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 0 days.

(21) Appl. No.: 15/928,274

(22) Filed: Mar. 22, 2018

(65) Prior Publication Data
US 2018/0209326 A1 Jul. 26, 2018

Related U.S. Application Data (63) Continuation of application No. PCT/US2016/054248, filed on Sep. 28, 2016.
(Continued)

(51) Int. Cl.
*F02B 3/08* (2006.01)
*F02B 33/22* (2006.01)
(Continued)

(52) U.S. Cl.
CPC .......... *F02B 3/08* (2013.01); *F02B 3/06* (2013.01); *F02B 33/22* (2013.01); *F02B 33/443* (2013.01);
(Continued)

(58) Field of Classification Search
CPC .......... F02B 3/08; F02B 43/12; F02B 33/443; F02B 33/22; F02B 2043/103; F02B 3/06;
(Continued)

(56) References Cited

U.S. PATENT DOCUMENTS

| 5,460,329 A | 10/1995 | Sturman |
|---|---|---|
| 5,638,781 A | 6/1997 | Sturman |

(Continued)

FOREIGN PATENT DOCUMENTS

WO  WO-2016/196839  12/2016

OTHER PUBLICATIONS

"International Search Report and Written Opinion of the International Searching Authority dated Dec. 19, 2016; International Application No. PCT/US2016/054248", dated Dec. 19, 2016.

*Primary Examiner* — Scott A Reinbold
(74) *Attorney, Agent, or Firm* — Womble Bond Dickinson (US) LLP (57) ABSTRACT

The engines include compression cylinders, combustion cylinders, an air rail, and a heat exchanger. The methods of operating a compression ignition engine include taking air into a compression cylinder of the engine, compressing the air in the compression cylinder to raise the pressure and temperature of the air, passing the compressed air through a heat exchanger, and from the heat exchanger into a combustion cylinder, further compressing the compressed air during a compression stroke of the combustion cylinder, igniting fuel in the combustion cylinder at or near the end of the compression stroke by compression ignition, followed by a power stroke, and opening an exhaust valve at the end of the power stroke and passing at least some of the exhaust in the combustion cylinder through the heat exchanger to heat air that has been compressed in the compression cylinder and is then passing through the heat exchanger.

22 Claims, 4 Drawing Sheets

Related U.S. Application Data (60) Provisional application No. 62/233,918, filed on Sep. 28, 2015.

(51) Int. Cl.

| | | |
|---|---|---|
| *F02D 19/10* | (2006.01) | |
| *F02M 31/04* | (2006.01) | |
| *F02M 31/087* | (2006.01) | |
| *F02B 3/06* | (2006.01) | |
| *F02B 33/44* | (2006.01) | |
| *F02B 43/12* | (2006.01) | |
| *F02D 19/06* | (2006.01) | |
| *F02M 21/02* | (2006.01) | |
| *F02D 41/00* | (2006.01) | |
| *F02B 43/10* | (2006.01) | |

(52) U.S. Cl.
CPC .......... *F02B 43/12* (2013.01); *F02D 19/0639* (2013.01); *F02D 19/0694* (2013.01); *F02D 19/10* (2013.01); *F02M 21/0206* (2013.01); *F02M 21/0215* (2013.01); *F02M 31/042* (2013.01); *F02M 31/087* (2013.01); *F02B 2043/103* (2013.01); *F02D 41/0025* (2013.01); *Y02T 10/12* (2013.01); *Y02T 10/30* (2013.01)

(58) Field of Classification Search
CPC .......... F02M 21/0215; F02M 21/0206; F02M 31/087; F02M 31/042; F02D 19/0694; F02D 19/0639; F02D 19/10; F02D 41/0025; Y02T 10/32; Y02T 10/126; Y02T 10/36
USPC ....................................................... 123/299
See application file for complete search history.

(56) References Cited

U.S. PATENT DOCUMENTS

| | | | |
|---|---|---|---|
| 5,713,316 A | 2/1998 | Sturman | |
| 5,720,261 A | 2/1998 | Sturman et al. | |
| 5,829,396 A | 11/1998 | Sturman | |
| 5,954,030 A | 9/1999 | Sturman et al. | |
| 5,960,753 A | 10/1999 | Sturman | |
| 5,970,956 A | 10/1999 | Sturman | |
| 6,012,644 A | 1/2000 | Sturman et al. | |
| 6,085,991 A | 7/2000 | Sturman | |
| 6,148,778 A | 11/2000 | Sturman | |
| 6,161,770 A | 12/2000 | Sturman | |
| 6,173,685 B1 | 1/2001 | Sturman | |
| 6,257,499 B1 | 7/2001 | Sturman | |
| 6,308,690 B1 | 10/2001 | Sturman | |
| 6,360,728 B1 | 3/2002 | Sturman | |
| 6,415,749 B1 | 7/2002 | Sturman et al. | |
| 6,557,506 B2 | 5/2003 | Sturman | |
| 6,575,126 B2 | 6/2003 | Sturman | |
| 6,739,293 B2 | 5/2004 | Turner et al. | |
| 7,025,326 B2 | 4/2006 | Lammert et al. | |
| 7,032,574 B2 | 4/2006 | Sturman | |
| 7,108,200 B2 | 9/2006 | Sturman | |
| 7,182,068 B1 | 2/2007 | Sturman et al. | |
| 7,341,028 B2 | 3/2008 | Klose et al. | |
| 7,387,095 B2 | 6/2008 | Babbitt et al. | |
| 7,412,969 B2 | 8/2008 | Pena et al. | |
| 7,568,632 B2 | 8/2009 | Sturman | |
| 7,568,633 B2 | 8/2009 | Sturman | |
| 7,694,891 B2 | 4/2010 | Sturman | |
| 7,717,359 B2 | 5/2010 | Sturman | |
| 7,730,858 B2 | 6/2010 | Babbitt et al. | |
| 8,196,844 B2 | 6/2012 | Kiss et al. | |
| 8,282,020 B2 | 10/2012 | Kiss et al. | |
| 8,327,831 B2 | 12/2012 | Sturman | |
| 8,342,153 B2 | 1/2013 | Sturman | |
| 8,366,018 B1 | 2/2013 | Giordano et al. | |
| 8,579,207 B2 | 11/2013 | Sturman | |
| 8,628,031 B2 | 1/2014 | Kiss | |
| 8,629,745 B2 | 1/2014 | Sturman et al. | |
| 8,733,671 B2 | 5/2014 | Sturman | |
| 8,887,690 B1 | 11/2014 | Sturman | |
| 9,026,339 B1 | 5/2015 | Sturman | |
| 9,181,890 B2 | 11/2015 | Sturman | |
| 9,932,894 B2 | 4/2018 | Sturman | |
| 2002/0017573 A1 | 2/2002 | Sturman | |
| 2002/0023625 A1 | 2/2002 | Sturman | |
| 2002/0023626 A1 | 2/2002 | Sturman | |
| 2003/0015155 A1 | 1/2003 | Turner et al. | |
| 2003/0056751 A1* | 3/2003 | Sukegawa | F02B 1/12 123/305 |
| 2003/0159665 A1* | 8/2003 | Coney | F02B 25/14 123/65 VD |
| 2004/0065854 A1 | 4/2004 | Lammert et al. | |
| 2004/0149255 A1* | 8/2004 | zur Loye | F02B 1/04 123/295 |
| 2004/0188537 A1 | 9/2004 | Sturman | |
| 2004/0238657 A1 | 12/2004 | Sturman | |
| 2005/0211201 A1 | 9/2005 | Klose et al. | |
| 2005/0263116 A1 | 12/2005 | Babbitt et al. | |
| 2006/0112913 A1* | 6/2006 | Warren | F01B 9/06 123/68 |
| 2006/0150931 A1 | 7/2006 | Sturman | |
| 2006/0157581 A1 | 7/2006 | Kiss et al. | |
| 2006/0192028 A1 | 8/2006 | Kiss | |
| 2007/0007362 A1 | 1/2007 | Sturman | |
| 2007/0113906 A1 | 5/2007 | Sturman et al. | |
| 2007/0246014 A1 | 10/2007 | Pena et al. | |
| 2008/0087738 A1 | 4/2008 | Sturman | |
| 2008/0236525 A1 | 10/2008 | Babbitt et al. | |
| 2008/0277504 A1 | 11/2008 | Sturman | |
| 2009/0199819 A1 | 8/2009 | Sturman | |
| 2009/0212126 A1 | 8/2009 | Sturman | |
| 2010/0012745 A1 | 1/2010 | Sturman | |
| 2010/0186716 A1 | 7/2010 | Sturman | |
| 2010/0229838 A1* | 9/2010 | Sturman | F01L 1/28 123/525 |
| 2010/0277265 A1 | 11/2010 | Sturman et al. | |
| 2011/0163177 A1 | 7/2011 | Kiss | |
| 2012/0080110 A1 | 4/2012 | Kiss et al. | |
| 2013/0075498 A1 | 3/2013 | Sturman | |
| 2014/0138454 A1 | 5/2014 | Sturman | |
| 2015/0136071 A1 | 5/2015 | Dortch, Jr. | |

\* cited by examiner

FULLY FLEXIBLE, SELF-OPTIMIZING, DIGITAL HYDRAULIC ENGINES AND METHODS WITH PREHEAT

CROSS-REFERENCE TO RELATED APPLICATIONS

This application is a continuation of International Application No. PCT/US2016/054248 filed Sep. 28, 2016 which claims the benefit of U.S. Provisional Patent Application No. 62/233,918 filed Sep. 28, 2015.

BACKGROUND OF THE INVENTION

1. Field of the Invention

The present invention relates to the field of compression ignition engines.

2. Prior Art

Compression ignition engines are well known in the prior art, the most common of which are engines typically run on diesel and biodiesel fuel. Such engines also have been operated on various oils such as heating oil and cooking oils, though typically on an individual basis and not on a commercial basis. Diesel engines, and potentially other compression engines, have an advantage in that they tend to be more efficient than gasoline engines, particularly at less than full engine power output because of the absence of the intake air pressure loss due to carburation in spark ignition engines causing lower intake manifold pressures.

In theory, the principle of compression ignition, wherein the heat of compression is adequate to ignite a fuel that is already in the combustion chamber or injected into the combustion chamber after the ignition temperature has been reached and the piston is at or near top dead center, is applicable to numerous other fuels, both liquid and gaseous. Of particular interest is compressed natural gas (CNG) and ammonia ($NH_3$). Natural gas is of interest because of its abundance and low cost, but has the disadvantages of very high self-ignition temperatures and an inability to be liquefied at reasonable temperatures and pressures for normal distribution and for mid to long term storage as a liquid fuel. Consequently it is only used as a compressed gas (CNG) in spark ignition engines and compression ignition engines using a diesel fuel to ignite the CNG.

Ammonia ($NH_3$) is of special interest because it is readily storable in liquid form at reasonable temperatures and pressures, is renewable (can be manufactured given a source of energy), and is carbon free, so causes no $CO_2$ emission on combustion. However $NH_3$ has a very high self-ignition temperature, and its use as a fuel currently remains in an experimentation stage of development.

DETAILED DESCRIPTION OF THE PREFERRED EMBODIMENTS

The fully flexible, self-optimizing, digital hydraulic engines with preheat disclosed herein are camless engines of an electronically controllable valve design, such as hydraulically actuated valves, examples of which are disclosed in U.S. Pat. Nos. 5,638,781, 5,713,316, 5,960,753, 5,970,956, 6,148,778, 6,173,685, 6,308,690, 6,360,728, 6,415,749, 6,557,506, 6,575,126, 6,739,293, 7,025,326, 7,032,574, 7,182,068, 7,341,028, 7,387,095, 7,568,633 7,730,858, 8,342,153 and 8,629,745, and U.S. Patent Application Publication No. 2007/0113906, though other forms of electronic control of engine valve operation which allow full electronic control of engine valve operation may be used, as desired. The engines disclosed herein also use electronically controlled fuel injectors, such as disclosed in one or more of U.S. Pat. Nos. 5,460,329, 5,720,261, 5,829,396, 5,954,030, 6,012,644, 6,085,991, 6,161,770, 6,257,499, 7,032,574, 7,108,200, 7,182,068, 7,412,969, 7,568,632, 7,568,633, 7,694,891, 7,717,359, 8,196,844, 8,282,020, 8,342,153, 8,366,018, 8,579,207, 8,628,031, 8,733,671 and 9,181,890, and U.S. Patent Application Publication Nos. 2002/0017573, 2006/0192028, 2007/0007362, 2010/0012745, and 2014/0138454, though other electronically controlled fuel injectors may be used, as desired.

Figure 1:
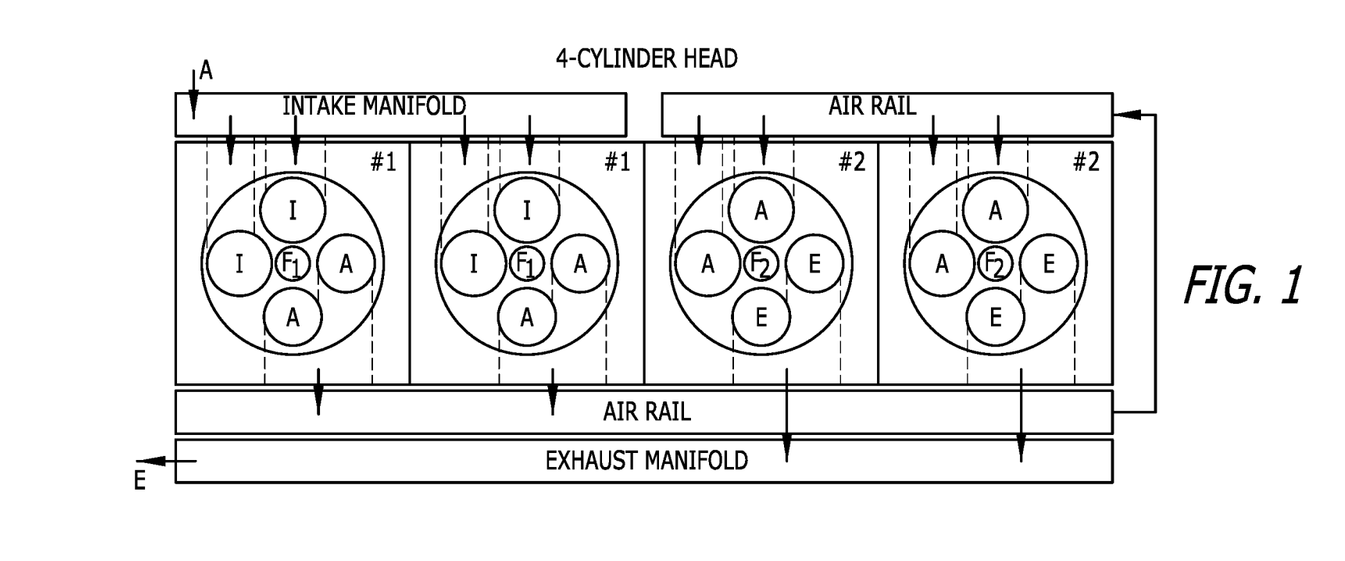
FIG. 1 is a schematic illustration of an exemplary four cylinder engine head and associated parts of an engine in accordance with the present invention, though of course may represent one of two heads in a corresponding V8 engine.

FIG. 1 is a schematic illustration of an exemplary four-cylinder engine head and associated components, though of course may represent one of two heads in a corresponding V8 engine. As shown in FIG. 1, the four cylinders are grouped into two two-cylinder groups, namely, Group #1 and Group #2. The Group #1 which are compression cylinders in this exemplary embodiment include two intake valves I coupled to an Intake Manifold to which air, typically at ambient air temperature, is provided, and two pressurized air outlet valves A coupled to an Air Rail. These cylinders also have a fuel injector $F_1$ for injecting a fuel to provide a premix of air and fuel to the Air Rail when a gaseous fuel is used.

The Group #2 are combustion cylinders and include pressurized air intake valves A coupled to the Air Rail and two exhaust valves E coupled to the Exhaust Manifold. The Group #2 combustion cylinders also include a fuel injector $F_2$ for a liquid fuel suitable for compression ignition, such as by way of example, a diesel or biodiesel type fuel, hereinafter simply diesel fuel.

Figure 2:
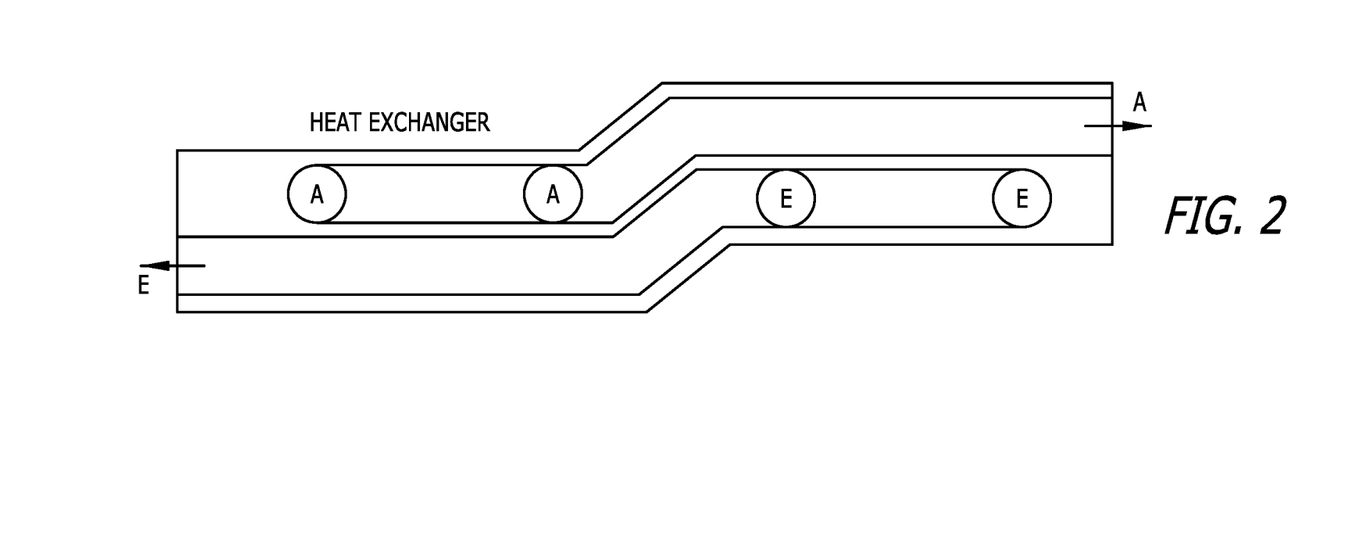
FIG. 2 is a schematic illustration of the relative placement of the Air Rail, Exhaust Manifold and Heat Exchanger of the engine of FIG. 1.

FIG. 1 also shows the Air Rail next to the Exhaust Manifold. In that regard, this relative placement of the Air Rail and Exhaust Manifold is intentional and preferably forms a relatively good Heat Exchanger between the two rails, as schematically illustrated in FIG. 2. Note that the heating of the air in the Air Rail by the heat of the exhaust does not affect the air mass flow passing through either of the Group #1 compression cylinders, except to the extent that it can affect the pressure in the Air Rail, as the intake to each of the Group #1 compression cylinders is at ambient temperature, and the air provided therefrom at elevated pressure through valves A to the Air Rail will be elevated in temperature only to the extent of the compression provided thereto by the respective compression cylinder. One could use a supercharger if desired, though a supercharger is not normally used in the preferred embodiments.

The design of the Heat Exchanger may take many forms. For instance the air flow and the exhaust flows need not each be a single passage, but instead may be by way of multiple, interleaved passages to provide enhanced heat exchange. Also, obvious rearrangement or reconfiguration of the Heat Exchanger may be made to provide a better balance in the heat transfer so as to better equalize the temperature of the air or premix passing into the combustion cylinders.

Figure 3:
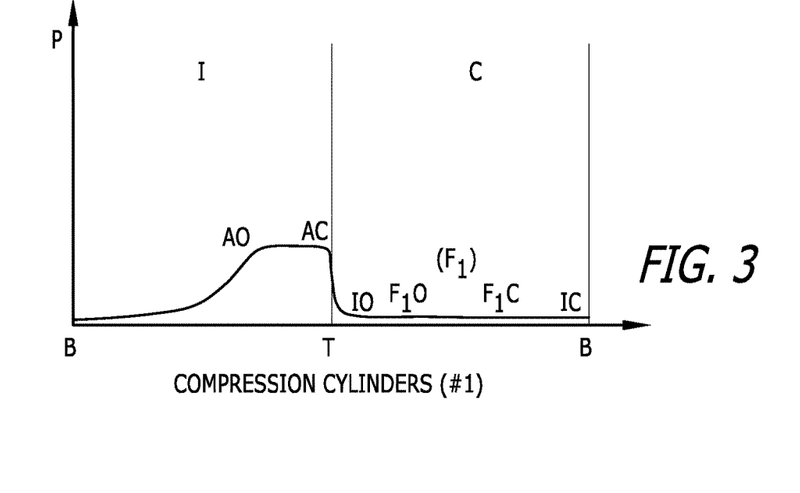
FIG. 3 illustrates a two-stroke operation of the Group #1 compression cylinders.
Figure 4:
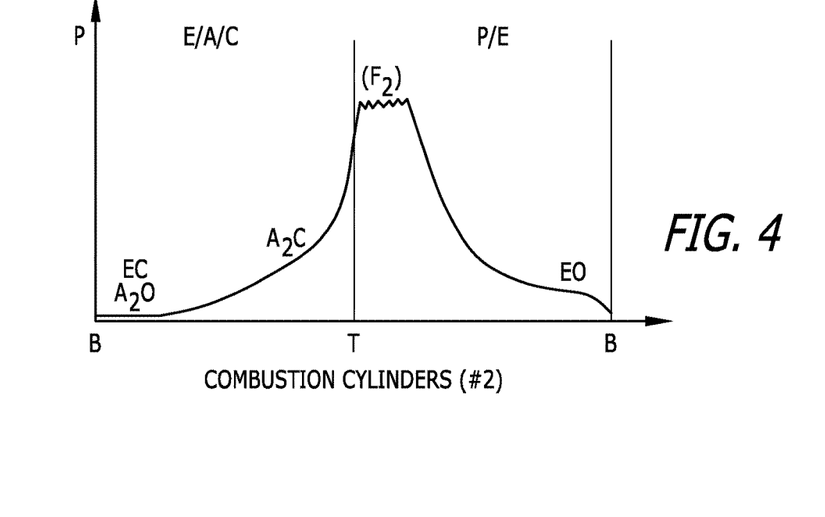
FIG. 4 illustrates an exemplary operation of the Group #2 combustion cylinders in a two stroke mode.

As previously mentioned, all of the engine valves I, A and E are electronically controlled valves, and accordingly, may be operated with any timing desired relative to the piston motion within the respective cylinders. A preferred operation of the engine is as a two-stroke engine, as illustrated in FIGS. 3 and 4, though operation as a four-stroke engine is a clear option. When running as a four-stroke engine, the compression cylinders will be operating in a two-stroke manner, so that there will be two compression strokes for each combustion (power) stroke, thereby nearly doubling the air available for each power stroke.

FIGS. 3 and 4 are highly schematic, though are adequate to convey the general principles of the operation of the present invention. In particular, FIG. 3 illustrates the two-stroke operation of the Group #1 compression cylinders. During a compression stroke, as the engine piston moves from the bottom dead center position toward the top dead center position, air (or air and gaseous fuel, hereafter a premix) are compressed until air valves A are opened (AO in FIG. 3), with air valves A of the respective compression cylinder being closed (AC) at the top dead center position of the piston. When air valves A are closed at the top dead center position, there will be some pressurized air or premix left in the compression cylinder. Thus, as the piston of the respective compression cylinder moves past the top dead center position, that remaining pressurized air will be expanded back to the ambient pressure, after which intake valves I are opened (IO), and if a premix is being used, the gaseous fuel will be injected sometime between the top dead center position and bottom dead center position ($F_1O$ and $F_1C$), with intake valves I being closed (IC) when the bottom dead center position is again reached.

Thus, the amount of air or premix delivered to the Air Rail will be substantially equal to the full displacement of the compression cylinder minus whatever is left at the elevated pressure when air valves A delivering pressurized air or premix are closed at the top dead center position of the compression cylinder. However, note that in the event it is desired to reduce the amount of air or premix delivered to the Air Rail, air valves A might be closed before the respective compression piston reaches the top dead center position. This traps additional pressurized air or premix in the compression cylinder, which after the piston moves away from the top dead center position, will take longer to expand during the intake stroke, so that intake valves I can be opened later (IO), thereby reducing the amount of new air or premix that will be delivered to the Air Rail. Accordingly, assuming the compression ratio is relatively high in the Group #1 compression cylinders, the amount of air or premix delivered to the Air Rail will be somewhat dependent on the pressure in the Air Rail, though that amount is fully controllable such as by the control of the closure of air valves A. An alternate method of controlling the air or air and premix that is delivered to the Air Rail is to close the intake valves I before the intake stroke is completed.

An exemplary operation of the Group #2 combustion cylinders in a two-stroke mode is illustrated with respect to FIG. 4. This Fig., like FIG. 3, is also highly schematic. As shown in FIG. 4, during a compression stroke, air valves $A_2$ are opened sometime during that compression stroke ($A_2O$) and closed ($A_2C$) at a later time during the compression stroke. Then, at or near the top dead center position, liquid fuel is injected to initiate and sustain combustion, preferably through a series of short injection pulses, which avoids pressure and temperature peaks, sustains combustion over a larger crankshaft angle, and in addition, avoids the formation of a substantial boundary layer that would build up around a continuous injection stream. This helps reduce or avoid hot spots in a thicker boundary layer, which can cause the formation of $NO_x$ because of those hot spots. Of course, the illustration of the variation in pressure with the injection pulses is again schematic, in that the pressure in fact may be sloped during that time period, either upward or more likely, downward. Then, once the injection pulses terminate, the pressure in the combustion chamber will decrease in the normal manner. At or near the end of the power stroke the exhaust valves are opened (EO) and then at the beginning of the next compression stroke are closed (EC).

The preceding, of course, presumes that the engine is running on a liquid fuel using compression ignition. If, on the other hand, the engine is running on a premix, the cycle is generally similar, with compression ignition occurring at the top dead center position, though of course the profile from the top dead center position at which the compression ignition occurs down to the bottom dead center position thereafter will be of a more conventional shape. Timing of the ignition of the premix is readily controllable by control of the timing of valve operation. Also of course, as a further alternative, if desired, a premix may be used and a small injection pulse of a liquid fuel such a diesel or biodiesel fuel used at or near the top dead center position to initiate combustion in the premix, after which the premix becomes the primary source of power during the power stroke. If, on the other hand, the premix itself is used for compression ignition as well as power, the time of ignition may readily be controlled with respect to crankshaft angle by control of one or more sets of valves in the overall engine system. In particular, as previously mentioned, the amount of air or premix delivered to the Air Rail may be controlled by controlling intake valves I in the compression cylinders. Further, the amount of premix injected into the combustion cylinders during the compression stroke may be controlled by controlling the timing of the opening ($A_2O$) and closing ($A_2C$) of the air valves in the combustion cylinders.

The advantages of the engine and its exemplary operation as just described include the fact that compression ignition of a premix may be readily achieved because of the fact that the premix is well heated (though below a self-ignition temperature) by the Heat Exchanger operating between the Air Rail and the Exhaust Manifold. This preheating of a premix does not substantially affect the amount of premix which can be delivered to the combustion cylinders during their compression strokes because of the fact that the intake air to the compression cylinders is at ambient temperature and the premix output to the Air Rail is only increased in temperature by the result of its compression in a compression cylinder. That compression is not a compression of 25 to 1, but much lower, as the pressure in the Air Rail is only the pressure required to deliver that premix to the combustion cylinder early in its compression stroke. The further increase in temperature is achieved by the Heat Exchanger between the Air Rail and the Exhaust Manifold, so that when injected early in the compression stroke of FIG. 4, the additional compression, together with that preheated premix and the hot combustion products left in the combustion cylinders, will result in adequate combustion cylinder temperatures at the top dead center position to ignite the premix. In that regard, the temperature in a combustion cylinder when the piston is at the top dead center position can, as one example, be readily controlled by controlling the timing of the injection of the premix during the compression stroke of the combustion cylinder. In particular, if the premix from the Air Rail is injected early in the compression stroke of a combustion cylinder, it will undergo a maximum further compression starting from a premix temperature that is already relatively high, so that the temperature achieved at the top dead center position of a combustion cylinder may be the equivalent of a temperature that would be reached in a single cylinder with a compression ratio of 40 to 50 or more, when in fact the actual compression ratio for a combustion cylinder may be only in the area of 18 to 1. Thus, achieving temperatures equivalent to a very high compression ratio makes compression ignition of gaseous fuels such as compressed natural gas (CNG) and ammonia ($NH_3$) possible.

In that regard, cylinders dedicated for use as compression cylinders only will preferably have a higher compression ratio than cylinders used for combustion, such as the 25 to 1 versus 18 to 1. If the gaseous fuel is injected into the compression cylinders after the intake valves I are closed, the addition of the gaseous fuel will not reduce the amount of air taken in during the intake stroke. Thus during compression, substantially the full displacement contents of a compression cylinder undiluted by the gaseous fuel are delivered to the Air Rail, and on opening of the air valves A2 of a combustion cylinder, substantially the same mass of air is delivered to the combustion cylinder, assuming no net accumulation in the Air Rail.

In a steady state, the maximum amount of air or premix that can be injected into a combustion cylinder is equal to the maximum amount of air that is compressed by a compression cylinder. Thus each combustion cylinder will get no more air or premix than if it were operating with a standard intake stroke. However, the use of only one half of the cylinders as combustion (power) cylinders is made up by their operation in a two-stroke mode rather than a four-stroke mode.

When running on a gaseous fuel, whether ignited by its own compression ignition or by a pilot injection of a diesel fuel, the power output is limited by the fact that the amount of fuel in the premix is limited by the limits in allowable peak combustion chamber temperatures. Thus for maximum power, diesel fuel may be injected during the power stroke after the temperature in the combustion chamber from the combustion of the premix declines to sustain combustion over a larger crankshaft angle and to maximize the power output of the engine. Also, the diesel fuel may be used when necessary to increase the range of a vehicle in which the engine is used when the gaseous fuel reservoir is exhausted. In that regard, in embodiments using direct injection of liquid $NH_3$ into the combustion cylinders, it may be desirable or necessary to add a lubricant to the liquid $NH_3$ to reduce injector wear. Such a lubricant could be a hydrocarbon, such as diesel or biodiesel fuel which should mix well with $NH_3$. While this has the disadvantage of adding a hydrocarbon to the combustion event, the amount added would be small and could help with ignition, and the same injector could be used for injection of only diesel or biodiesel fuel for extended range operation when necessary. For starting, any of various techniques may be used, such as simply starting the engine in a conventional two-stroke mode using diesel fuel. Also of course, the present invention may be realized in engines of other configurations, such as six cylinder engines, for example.

Figure 5:
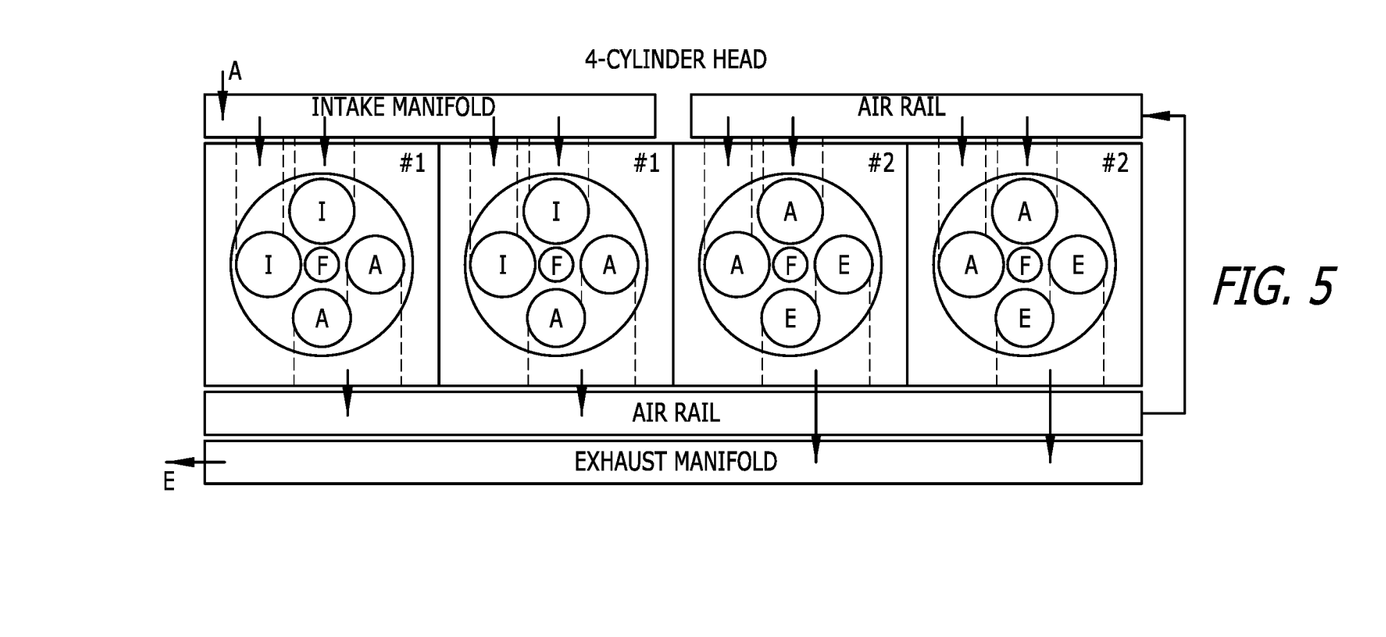
FIG. 5 illustrates a six stroke engine in which each cylinder has the same valving as that of the engine of FIG. 1, though with each cylinder having a fuel injector F for injecting $NH_3$ as a compression ignition fuel.

Now referring to FIG. 5, a six-stroke engine in which each cylinder has the same valving as that of the engine of FIG. 1, though with each cylinder having a fuel injector F for injecting $NH_3$ as a compression ignition fuel may be seen. Thus each cylinder can act as a compression cylinder or a combustion cylinder, or both. As in the embodiment of FIG. 1, heat transfer from the exhaust to the compressed air in the Air Rail is an important aspect of this embodiment, with a Heat Exchanger such as that schematically illustrated in FIG. 2 and described above being incorporated.

In the group 1 injectors F, these injectors may be either gas or liquid $NH_3$ injectors, and the injectors F for the Group #2 combustion cylinders are liquid $NH_3$ injectors. Such an engine may be operated various ways, all in a compression ignition mode. In particular, if the group 1 injectors F are gaseous $NH_3$ injectors, gaseous injection into the compression cylinders (Group #1 cylinders) may be used as previously described, and varied in amount to provide the desired power, limited however by the need to maintain combustion cylinder temperatures below which $NO_x$ will form. To augment the power output, the liquid $NH_3$ fuel injectors F may be used to inject additional $NH_3$ to help sustain combustion and elevate combustion cylinder pressures over much greater crankshaft angles.

If liquid $NH_3$ is injected into the compression cylinders (Group #1 cylinders) during their intake strokes, the heat absorbed in the conversion of the $NH_3$ to gaseous form can have a significant cooling effect to increase the density of the intake air and offset the displacement of air when gaseous $NH_3$ would otherwise have been injected. Of course, injecting liquid $NH_3$ in the compression cylinders can be used for compression ignition and to control lower engine output power levels, with injection of liquid $NH_3$ into the combustion cylinders after combustion is initiated being used when necessary to sustain combustion and elevate combustion cylinder pressures over much larger crankshaft angles.

Figure 6:
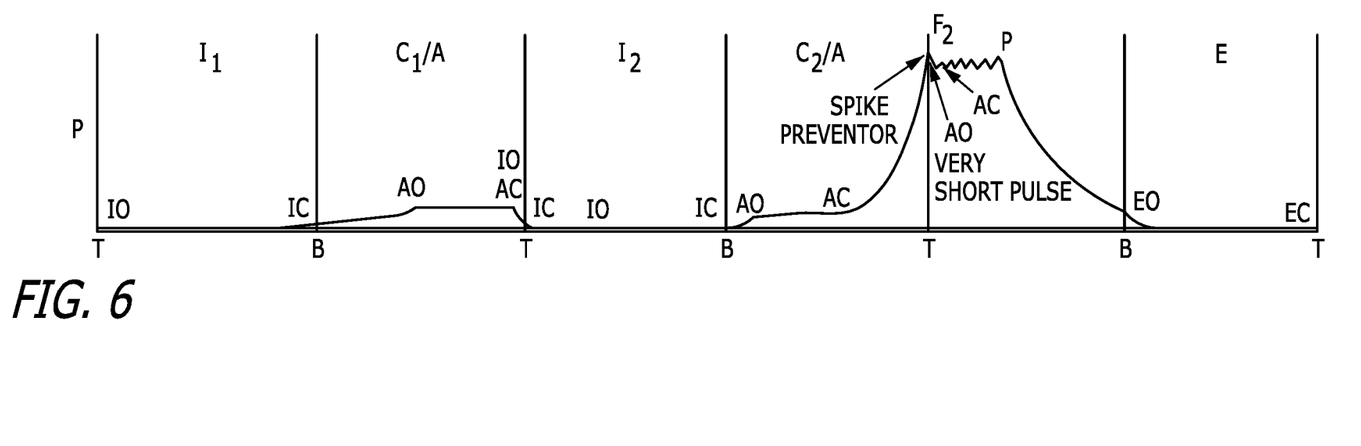
FIG. 6 illustrates an exemplary six stroke operating cycle.

In the engines of FIGS. 1 and 5, if the fuel injectors in the combustion cylinders are for a liquid fuel, such as diesel or biodiesel, an exemplary six-stroke operating cycle may be seen in FIG. 6. Most of this operating cycle will be obvious from the descriptions previously given herein, though with the first compression occurring in any cylinder. Then there is a second intake stroke followed by the start of a further compression stroke, then momentarily injecting air from the Air Rail prior to finishing that compression stroke, followed by the finishing of that compression stroke, after which compression ignition is obtained. Then a power stroke followed by an exhaust stroke is executed. However there is one major difference from an adaptation of the previous descriptions. In particular, normally on compression ignition, there is a pressure and temperature spike in the combustion chamber that can cause the formation of $NO_x$. However in the cycle illustrated, air valve(s) A are pulsed open, then closed at the time the spike would otherwise occur to vent the pressure spike to the Air Rail, which will also hold down the temperature spike. Obviously this requires very fast valve actuation, though the valve actuation systems previously mentioned will provide the desired valve actuation performance. Also, a small temporary pressurized air tank may need to be coupled to the Air Rail in any embodiments, though the Air Rail itself may have the capacity to provide the required temporary storage.

Also in the embodiment of FIG. 6, as well as other embodiments wherein the capability exists or is provided, a controlled amount of $NH_3$ may be injected into the combustion chamber during the exhaust stroke to reduce the amount of any $NO_x$ in the exhaust by converting at least some of the $NO_x$ to $N_2$ and $H_2O$.

Figure 7:
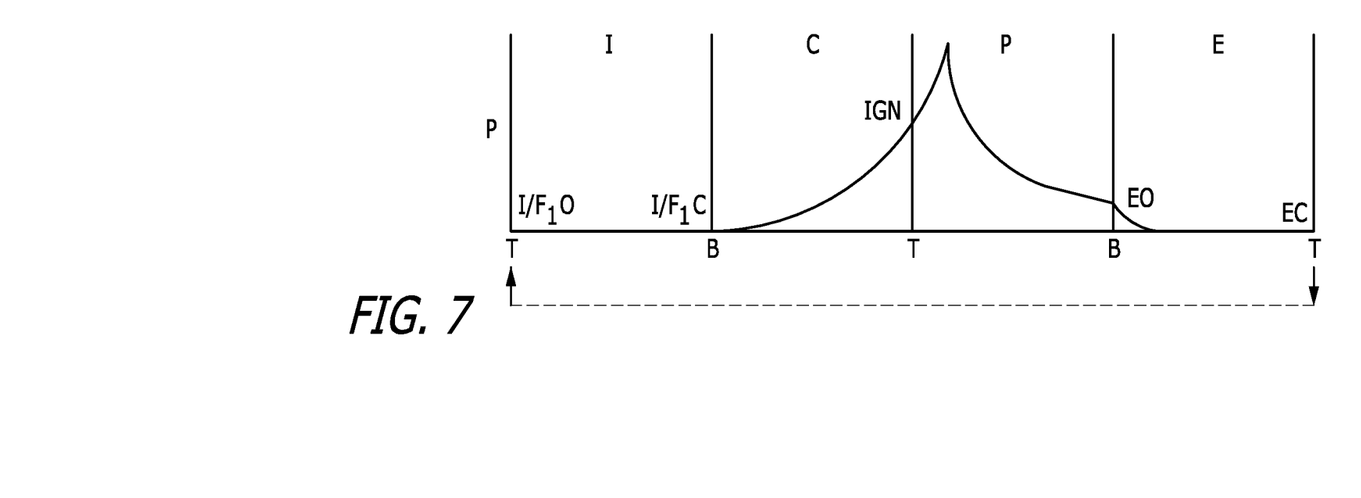
FIG. 7 illustrates an exemplary operation of the engine of FIG. 5 when using gaseous fuel injectors.

FIG. 7 illustrates an exemplary operation of the engine of FIG. 5 when using gaseous fuel injectors. The illustrated operation is a four-stroke H.C.C.I. cycle, as is well known in the art. Because of the effective increase in the compression ratio caused by the heating of the premix before the compression stroke, operation on gases such a CNG or $NH_3$ is possible. Actually, direct injection of $NH_3$ in liquid form is not out of the question, and may be considered a possible alternative to use of $NH_3$ for gaseous form, which would avoid the injection quantity/engine power limitations of H.C.C.I. operation.

In the embodiments using a "premix" of air and gaseous fuel, such embodiments may actually use a premix of air and a mix of gaseous fuels. Further, in the embodiment of FIGS. 1-4, FIG. 3 shows the gaseous fuel being injected during the intake stroke of the compression cylinders. In the case of CNG, the fuel can constitute up to approximately 10% by volume of the compression cylinder contents. If instead the CNG is injected just after the intake stroke of the compression cylinder was completed and the intake valves I were closed, a larger amount of intake air could be drawn into the compression cylinder during the intake stroke. In this case the injection of the gaseous fuel is still a relatively low pressure injection, and the injection could be completed before the compression stroke of the compression cylinder progressed very far. The point is that the injection of the gaseous fuel may occur anywhere and at any time before the compression stroke of the combustion cylinder raises the pressure in the combustion cylinder to high to facilitate gaseous fuel injection, including even in the Intake Manifold (FIG. 1).

In all of the embodiments hereinbefore described, the control of air mass flow is accomplished by control of the air intake valves I on the compression cylinders, which air mass flow must be taken into account for the control of the other parameters of an engine in accordance with the present invention. Also in the embodiments hereinbefore described, the number of compression cylinders and the number of combustion cylinders has been implied, if not stated, as being equal. Certainly that is not a limitation of the invention, whether on an instantaneous basis or on an average basis over a period of time. By way of example, the present invention method and apparatus may be practiced as and in a five cylinder engine, using three cylinders for compression and two for combustion for certain applications, and two cylinders for compression and three for combustion for other applications. Also with respect to air mass flow, one can use a high pressure air storage tank not only to absorb the pressure fluctuations in the Air Rail during any one operating cycle of an engine if the Air Rail storage capacity is not adequate for this purpose, but also to provide a longer storage capacity if desired. In general, preferably the storage capacity would be provided between the compression cylinders and the Heat Exchanger to minimize any resulting heat loss and to maintain the maximum benefit of the Heat Exchanger. Finally references to specific fuels such as $NH_3$ and CNG are to be understood to include fuels containing such fuels.

Thus the present invention has a number of aspects, which aspects may be practiced alone or in various combinations or sub-combinations, as desired. While preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a compression ignition engine comprising:
   taking air into a compression cylinder of the engine;
   compressing the air in the compression cylinder to raise the pressure and temperature of the air;
   passing the compressed air through a heat exchanger, and from the heat exchanger into a combustion cylinder during a compression stroke of the combustion cylinder by opening an air valve during the compression stroke of the combustion cylinder to allow the compressed air to pass from the heat exchanger into the combustion cylinder, and subsequently closing the air valve during the compression stroke of the combustion cylinder to stop the compressed air from passing from the heat exchanger into the combustion cylinder, thereby also preventing the compressed air from passing from the heat exchanger into the combustion cylinder during a power stroke of the combustion cylinder;
   further compressing the compressed air in the combustion cylinder during the compression stroke of the combustion cylinder;
   igniting fuel in the combustion cylinder at or after the end of the compression stroke by compression ignition, followed by the power stroke;
   opening an exhaust valve at the end of the power stroke and passing at least some of the exhaust in the combustion cylinder through the heat exchanger to heat air that has been compressed in the compression cylinder and is then passing through the heat exchanger.

2. The method of claim 1 wherein the fuel in the combustion cylinder at or after the end of the compression stroke is a gaseous fuel mixed with the air in the compression cylinder of the engine.

3. The method of claim 2 wherein the fuel in the combustion cylinder at or after the end of the compression stroke is a gaseous fuel mixed with the air not later than earlier in the compression stroke of the combustion cylinder.

4. The method of claim 2 wherein the fuel in the combustion cylinder at or after the end of the compression stroke is a gaseous fuel mixed with the air prior to entering the combustion cylinder.

5. The method of claim 4 wherein the gaseous fuel is or contains CNG.

6. The method of claim 4 wherein the gaseous fuel is or contains $NH_3$.

7. The method of claim 1 wherein the fuel is a liquid fuel injected into the combustion cylinder at or after the end of the compression stroke.

8. The method of claim 7 wherein the liquid fuel is diesel or biodiesel fuel.

9. The method of claim 7 wherein the liquid fuel is or contains $NH_3$.

10. The method of claim 1 wherein the fuel is a liquid fuel injected into the combustion cylinder at or after the end of the compression stroke when the temperature in the combustion chamber is sufficiently high to cause self-ignition of the liquid fuel.

11. The method of claim 1 wherein the ignited fuel in the combustion cylinder is a fuel mixed with the compressed air prior to entering the combustion cylinder, and further comprising injecting a liquid fuel into the combustion cylinder after igniting the fuel in the combustion cylinder at or after the end of the compression stroke by the compression ignition.

12. The method of claim 11 wherein the fuel ignited by compression ignition is or contains $NH_3$.

13. The method of claim 12 wherein the liquid fuel injected into the combustion chamber after compression ignition is or contains liquid $NH_3$.

14. The method of claim 1 wherein the fuel ignited by compression ignition is or contains $NH_3$, and wherein liquid $NH_3$ is injected into the combustion cylinder at or after the end of the compression stroke, and at other times, the fuel ignited by compression ignition is diesel or biodiesel fuel injected into the combustion cylinder at or after the end of the compression stroke using the same injector as used for the injection of $NH_3$.

15. The method of claim 1 wherein $NH_3$ is injected into the combustion cylinder during an exhaust stroke of the compression ignition engine to reduce any NOx content in the exhaust of the compression ignition engine.

16. A compression ignition engine comprising:
at least one compression cylinder;
at least one combustion cylinder;
an air rail coupled between a compressed air outlet of the compression cylinder and an intake of the combustion cylinder, to admit contents of the air rail into the combustion cylinder during a compression stroke of the combustion cylinder, wherein an air valve opens during the compression stroke of the combustion cylinder to admit the contents of the air rail into the combustion cylinder, and subsequently closes during the compression stroke of the combustion cylinder to stop the contents of the air rail from being admitted into the combustion cylinder, thereby also preventing the contents of the air rail from being admitted into the combustion cylinder during a power stroke of the combustion cylinder;
an exhaust manifold; and
a heat exchanger coupled between the air rail and the exhaust manifold to transfer heat from an exhaust in the exhaust manifold to the contents of the air rail.

17. The compression ignition engine of claim 16 further comprising a liquid fuel injector in the combustion cylinder.

18. The compression ignition engine of claim 17 wherein the fuel injector in the at least one compression cylinder is a liquid fuel injector for injecting a fuel consisting of or containing liquid $NH_3$.

19. The compression ignition engine of claim 17 wherein the liquid fuel injector is an injector for injecting diesel or biodiesel fuel at times, and for injecting a fuel consisting of or containing liquid $NH_3$ at other times.

20. The compression ignition engine of claim 17 further comprising a fuel injector in the at least one compression cylinder.

21. The compression ignition engine of claim 20 wherein the fuel injector in the at least one compression cylinder is a fuel injector for injecting a gaseous fuel consisting of or containing CNG or $NH_3$.

22. The compression ignition engine of claim 20 wherein the fuel injector in the at least one compression cylinder is a fuel injector for injecting a liquid fuel consisting of or containing $NH_3$.

* * * * *